US007901535B2

(12) United States Patent
Yu

(10) Patent No.: US 7,901,535 B2
(45) Date of Patent: Mar. 8, 2011

(54) APPARATUS AND METHOD FOR MAKING CELLULAR SHADE MATERIAL

(75) Inventor: Fu-Lai Yu, Taipei Hsieh (TW)

(73) Assignee: Teh Yor Co., Ltd., Taipei (TW)

( * ) Notice: Subject to any disclaimer, the term of this patent is extended or adjusted under 35 U.S.C. 154(b) by 1379 days.

(21) Appl. No.: 11/063,764

(22) Filed: Feb. 23, 2005

(65) Prior Publication Data

US 2006/0185787 A1 Aug. 24, 2006

(51) Int. Cl.
*B32B 15/00* (2006.01)

(52) U.S. Cl. ......... 156/260; 156/197; 156/252; 156/264; 156/227; 156/291; 156/512; 156/559; 156/578

(58) Field of Classification Search .................. 156/197, 156/252, 264, 227, 291, 512, 559, 578
See application file for complete search history.

(56) References Cited

U.S. PATENT DOCUMENTS

| | | | | |
|---|---|---|---|---|
| 3,466,957 | A * | 9/1969 | Anderson et al. | 83/23 |
| 3,475,252 | A * | 10/1969 | White | 156/353 |
| 3,477,893 | A | 11/1969 | Brazener et al. | |
| 3,675,522 | A * | 7/1972 | Hull | 83/14 |
| 4,290,837 | A * | 9/1981 | Bova | 156/256 |
| 4,301,700 | A * | 11/1981 | Greven | 83/91 |
| 4,631,108 | A | 12/1986 | Colson | 156/461 |
| 4,849,062 | A * | 7/1989 | Jennet et al. | 156/364 |
| 5,062,340 | A * | 11/1991 | Greven | 83/95 |
| 5,228,936 | A | 7/1993 | Goodhue | 156/260 |
| 5,308,435 | A | 5/1994 | Ruggles et al. | 156/465 |
| 5,441,592 | A | 8/1995 | Ruggles et al. | 156/563 |
| 5,516,385 | A | 5/1996 | Romeo et al. | 156/200 |
| 5,630,900 | A | 5/1997 | Huang | 156/227 |
| 5,664,773 | A | 9/1997 | Sevcik et al. | |
| 5,670,008 | A | 9/1997 | Ruggles | 156/264 |
| 5,714,034 | A | 2/1998 | Goodhue | 156/512 |
| 6,527,895 | B1 | 3/2003 | Palmer | |
| 6,543,506 | B1 | 4/2003 | Phillips | 156/353 |
| 2004/0194878 | A1* | 10/2004 | Hull, Jr. et al. | 156/252 |
| 2006/0266469 | A1* | 11/2006 | Yu | 156/264 |

* cited by examiner

*Primary Examiner* — Philip C Tucker
*Assistant Examiner* — Kimberly K McClelland
(74) *Attorney, Agent, or Firm* — Olson & Cepuritis, Ltd.

(57) ABSTRACT

An apparatus and method for making expandable honeycomb structures suitable for use as window coverings is provided. Material is fed to a folder and past a cutter. Adhesive is applied to the material downstream of the cutter and the material is cut to desired lengths. The cut strips of material are stacked with similarly formed strips to form the honeycomb structure.

14 Claims, 5 Drawing Sheets

APPARATUS AND METHOD FOR MAKING CELLULAR SHADE MATERIAL

TECHNICAL FIELD OF THE INVENTION

This invention relates to an improved apparatus and a method for making a cellular shade material.

BACKGROUND OF THE INVENTION

One well-known type of window treatment is the honeycomb window shade. In a honeycomb window shade is made up of an interconnected series of rows of cells of a thin foldable material suspended from a headrail. There are a variety of apparatus and methods known in the art for manufacturing such honeycomb shades. One technique, disclosed in U.S. Pat. No. 4,450,027 to Colson, involves folding a continuous strip of fabric into a tube, applying adhesive to the exterior of the tube and then winding the tube onto a rotating rack so that the adjacent windings of the stacked tube are bonded together to form a honeycomb array or stack of cells. The stacked array of cells is then cut and the cellular structure removed from the tube. U.S. Pat. No. 5,228,936 and U.S. Pat. No. 5,714,034 to Goodhue is directed to another apparatus and method for making a cellular structure. In these patents, a continuous process of folding a strip of material to form a tubular structure, applying adhesive to the tubular structure, cutting the strip including adhesive and stacking the cut strips to form a cellular structure is disclosed. One disadvantage with such a process and apparatus is that since the adhesive is applied to the strip of material before cutting, the process requires the further step of chilling or heating the material after the adhesive has been applied to dry or cure the adhesive. This is done so as to reduce the amount of adhesive residue on components located downstream in the process, such as the cutter and feed rollers.

The number of columns of cells in the honeycomb structure may also be varied in their construction by adjusting the folding pattern of the material. For example, U.S. Pat. No. 5,834,090 to Huang discloses a process in which individual strips of material are folded and attached together with an adhesive to create a cellular structure having multiple columns of cells by folding the strip into a variety of configurations before adhesively attaching the sheets together. One problem with this process is that a web is provided, which is folded and stacked, and therefore, different width webs must be utilized for different width window coverings.

The present invention is an improvement on the described devices and processes for making such honeycomb structures which offers several advantages over the existing art that will be evident to those skilled in the art. Some of these advantages are provided below.

SUMMARY OF THE INVENTION

A method and apparatus for making an expandable honeycomb structure suitable for a window covering is provided. A continuous ribbon or strip of material, which is typically provided in the form of a roll, is provided by a series of feed rollers in operative communication with a drive mechanism downstream to a folder. The folder folds the continuous ribbon as it is conveyed therethrough to form a preform from the ribbon of material. The preform can be folded in a manner that will create one or more tubes defined by the single strip of material. Alternatively, the preform can be folded in a way that the strip, when adhered to other similarly formed strips, forms the cells of the honeycomb panel. The preform includes portions which are folded to overlap with other portions, such as a marginal portion folded over a main portion, such as a central portion. The preform can also be prefabricated such that it is provided to the cutter from a pre-made supply. In other words, the formation of the preform does not need to be completed in a continuous process with the other fabricating steps.

The form of the rows that are eventually constructed may be varied by the folding pattern utilized. This may include single cell or double cell honeycombs, or symmetrical or asymmetrical shaped rows. The preforms may also form partial cells, which when adhered to similarly formed preforms form complete cells. The preform is then conveyed downstream by other feed rollers, which may be also operatively connected to the drive, past a cutter. The operation of the cutter is synchronized with the feeding of the preform such that a desired length of the preform may be transported past the cutter without being cut. When a desired length of the preform is conveyed past the cutter, the cutter severs at least a portion of the preform in a direction perpendicular to the machine direction to define a row member.

An adhesive applicator positioned downstream of the cutter applies at least one line of adhesive to the material after it passes the cutter. The portion of the material cut by the cutter does not include adhesive since the adhesive is applied downstream of the cutter. After the adhesive is applied and the preform is severed by the cutter to form the row member, the row member is transported to a stacker. The stacker bonds the row member with other similarly formed row members by stacking it therewith. The stacking is completed before another row member is conveyed into the stacker. References to downstream and upstream denote movement of materials through the process or positioning of equipment. In particular, moving downstream means moving towards the stacker, and being positioned downstream means being positioned closer to the stacker.

In some embodiments, the rate of progress of the row member into the stacker is increased. This can be accomplished through the use of a variety of components, however, it is preferred that an air flow device, such as a vacuum or a blower be used to urge the row member into the stacker.

One advantage of this embodiment over the methods and apparatus of the prior art such as disclosed above is a result of the positioning of the adhesive applicator. The prior art discloses the application of adhesive upstream of the cutter, and requires the additional step of cooling or heating the adhesive to dry or cure the adhesive so that adhesive residue on the cutter is reduced. Such an additional step is not required with the present invention. This is because the cutter is positioned upstream of the adhesive applicator. Accordingly, the process is more efficient since these additional curing steps are not required. For example, since the adhesive has not been cured, no additional heating or curing step is required to bond the row member to other row members in the stack. The present invention also requires less downtime to clean or replace cutter and roller components befouled with adhesive residue.

An optional feature of the present method and apparatus is the partial cutting of the preform. In other words, rather than completely sever the preform when forming the row member, the preform may instead be perforated such that a frangible material strip of material is created. The row member can then be fully separated by accelerating the row member relative to the remainder of the material strip.

While the present invention has been discussed thus far as only including a single adhesive application step, other variants are possible. For example, the process may include in the formation of the preform an additional step of applying adhesive to the ribbon of material, folding of the material, and adhering portions of the material to itself. This prefabricated preform can be supplied in the form of a roll. The cutter and rollers still would not endure the problem of unwanted adhesive residue since the adhesive already secures the material to itself and is preferably cured.

DESCRIPTION OF THE PREFERRED EMBODIMENT OF THE INVENTION

Figures 1, 2, 3, 4, 5, 6:
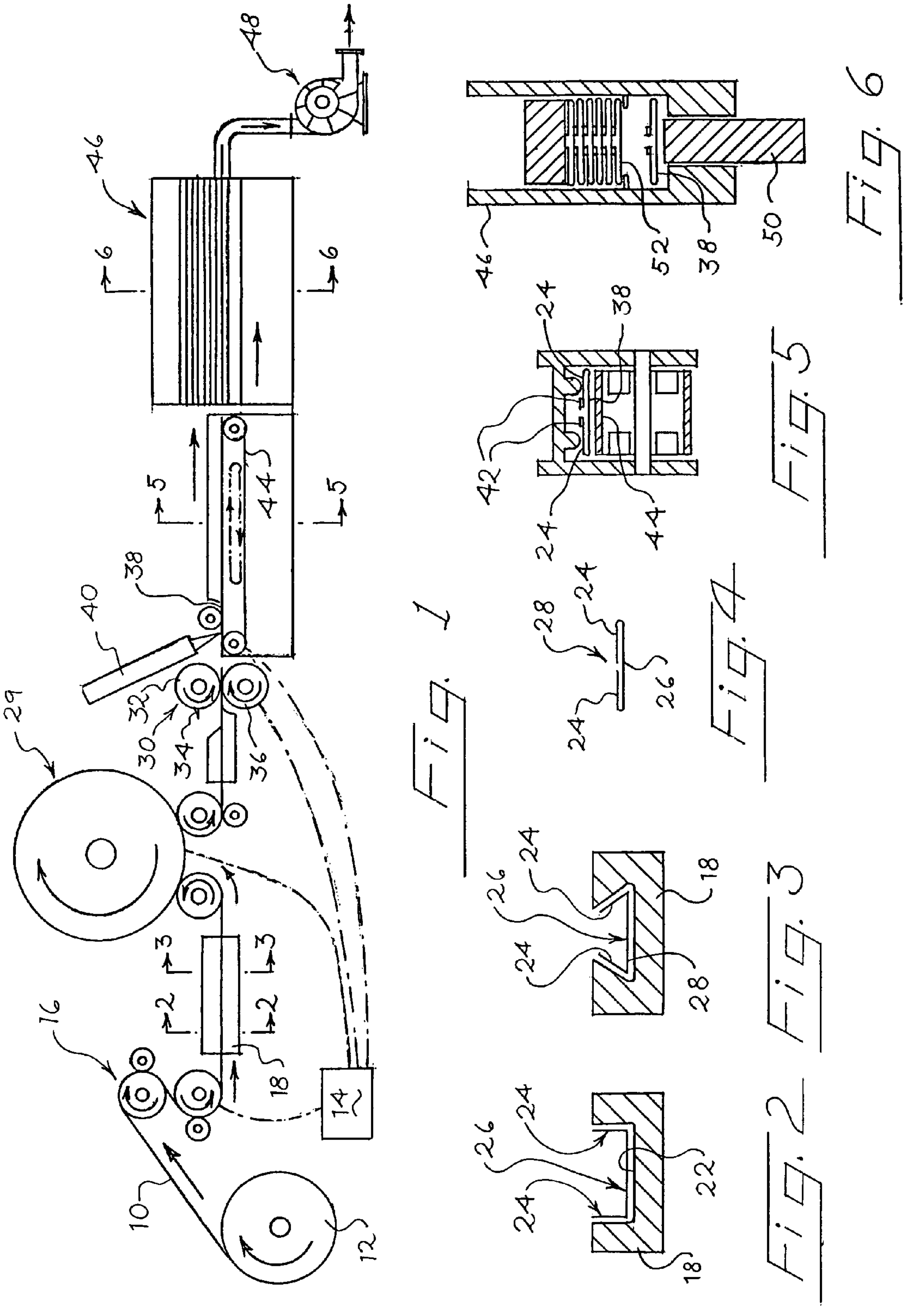
FIG. 1 is a schematic side view of one form of an apparatus for performing a method according to the present invention.
FIG. 2 is a cross-sectional view along the line 2-2 of FIG. 1.
FIG. 3 is a cross-sectional view along the line 3-3 of FIG. 1.
FIG. 4 is a cross-sectional view of a tubular preform.
FIG. 5 is a cross-sectional view along the line 5-5 of FIG. 1.
FIG. 6 is a cross-sectional view along the line 6-6 of FIG. 1.

The invention disclosed herein is susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments.

FIGS. 1-6 illustrate a preferred embodiment of the method and apparatus according to the present invention. A continuous ribbon or strip of material 10 is typically provided in the form of a roll 12. A drive mechanism operatively connected to a series of feed rollers 16, shown schematically as box 14, continuously pulls the material 10 off of the roll 12 and conveys the material 10 downstream to a folder 18. The material 10 is folded by the progression of the material 10 through the folder 18 to form a preform. For example, as shown in FIGS. 2 and 3, the material 10 is folded as it passes through channel 22 of folder 18. Other methods of folding will be recognized by those skilled in the art. In FIG. 2, the material is folded such that two opposed marginal portions 24 and a central portion 26 are formed. Referring to FIG. 3, the two marginal portions 24 are folded over the central portion 26 to form a tubular preform 28. After folding, the preform 28 includes two marginal portions 24 on top of the central portion 26 as shown in FIG. 4. Another series of feed rollers 29 which are also preferably operatively connected to drive 14, continues feeding the material 10, and in particular preform 28 downstream to a cutter 30. In this embodiment, the cutter is represented by one rotating drum or cutter 32 carrying a cutting blade 34 and a second rotating drum 36. The preform 28 is guided past cutter 30. The drums 32 and 36 rotate at a speed synchronized to the feeding rate of the preform 28 such that desired lengths of the material are cut, as is known in the art. As the blade 34 rotates and contacts the preform 28, the blade 34 severs the preform, thereby defining a row member 38.

Positioned downstream of the cutter 30 is an adhesive applicator 40 that applies at least one line of adhesive to the material that has passed downstream of the cutter 30. In this particular embodiment, a pair of lines of adhesive 42 are deposited as shown in FIG. 5. The adhesive lines are positioned at the edges of the marginal portions 24.

The row member 38 with adhesive lines 42 is supported by a conveyor belt 44 and is transported downstream to stacker 46. As the row member 38 approaches stacker 46, an airflow device, such as a vacuum 48, accelerates the downstream conveyance of the row member 38 into the stacker 46. Referring to FIG. 6, the row member 38 is supported within the stacker on lift member 50, which raises the row member 38 into contact with other similarly formed row members 52 and bonds row member 38 thereto. A detailed explanation of a preferred embodiment of the stacking device 46 is provided in U.S. Pat. No. 5,630,900, which is incorporated herein by reference. Unlike the prior art method and apparatus of U.S. Pat. No. 5,228,936 and U.S. Pat. No. 5,714,034 to Goodhue, there is no need to apply additional pressure and heat to activate the adhesive lines to cause the row members to adhere to one another because the adhesive in the present embodiment of the invention is not dried or cured as required in the prior art. Also, since the adhesive is applied downstream of the cutter, adhesive residue on the cutter 30 and feed rollers 29 is prevented.

Figure 7:
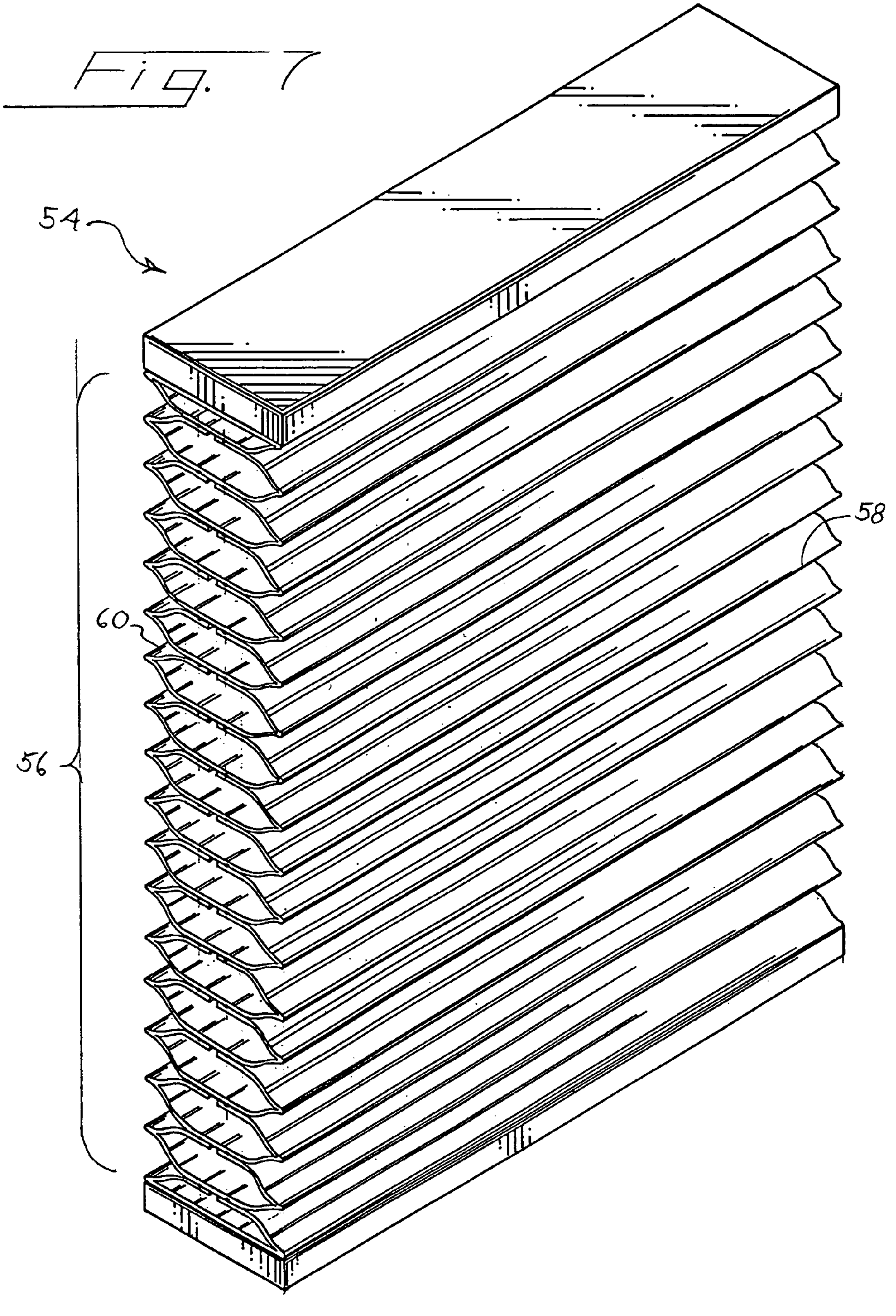
FIG. 7 is a perspective view of a window covering including the cellular structure formed according to the method of FIG. 1.

After forming the cellular structure, appropriate control cords and control mechanisms, which are typically found in a head rail, are attached to the cellular structure. A window covering 54 including the cellular structure 56 made according to the method described above is shown in FIG. 7. As shown, the cellular structure 56, when expanded forms a single column of cells having a symmetrical face 58 and rear 60.

It should be recognized that the particular material of the strips and the adhesive utilized are not critical aspects of the invention. Any materials commonly utilized in the art of cellular structures suitable for window coverings may be used. For example, the material for the rows may be fabric, paper, film, or the like.

Figure 8:
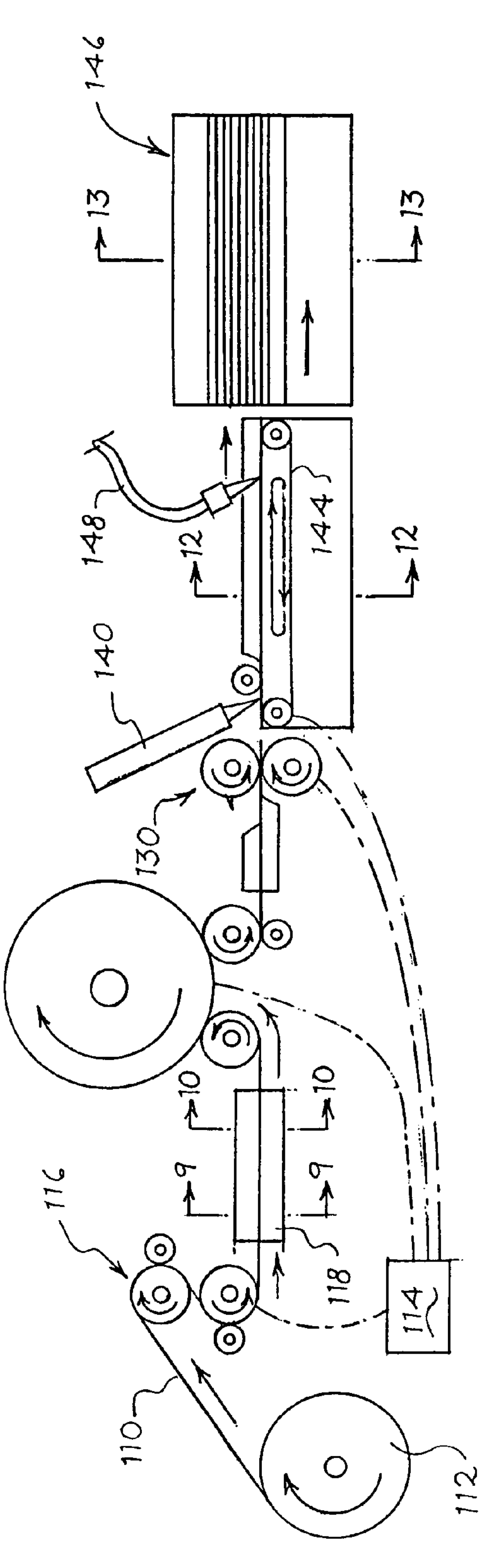
FIG. 8 is a schematic side view of an alternative form of an apparatus for performing a method according to the present invention.
Figure 12:
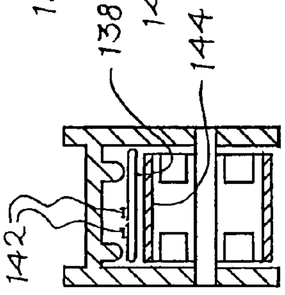
FIG. 12 is a cross-sectional view along the line 12-12 of FIG. 8.
Figure 11:
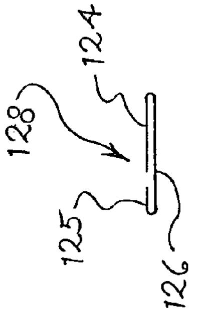
FIG. 11 is a cross-sectional view of a tubular preform.
Figure 10:
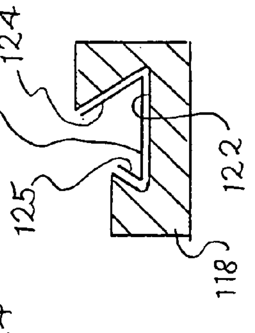
FIG. 10 is a cross-sectional view along the line 10-10 of FIG. 8.
Figure 9:
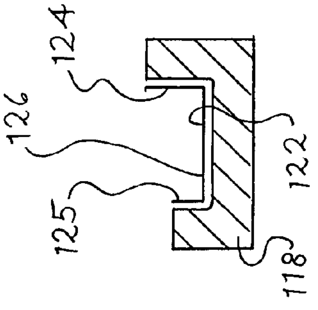
FIG. 9 is a cross-sectional view along the line 9-9 of FIG. 8.

Another embodiment of the present invention is shown in FIGS. 8-14. The apparatus and process depicted is similar to the previous embodiment. Referring to FIG. 8, a continuous ribbon of material 110 on roll 112 is conveyed by drive 114 and a series of rollers 116 downstream to a folder 118. The material 110 is again folded by the progression of the material 110 through the folder 118 to form a preform. In this embodiment, the folder 118 is configured to create a somewhat different preform than in the previous embodiment. As shown in FIGS. 9 and 10, the material 110 is folded as it passes through channel 122 of folder 118. The material is folded such that two marginal portions 124 and 125 and a central portion 126 are formed. Marginal portion 124 is wider than marginal portion 125 such that the preform 128 has an asymmetrical transverse cross section as shown in FIG. 11. The preform 128 again continues downstream to a cutter 130 and adhesive is applied in a similar fashion to that described above by applicator 140. Since the folding pattern of the present embodiment is somewhat different, the adhesive lines 142 are set down as shown in FIG. 12.

Figure 13:
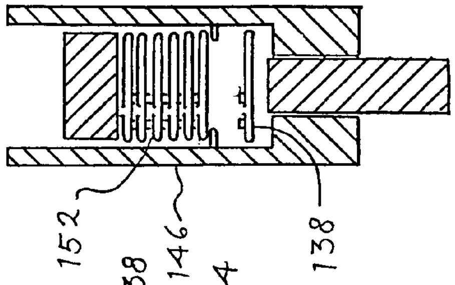
FIG. 13 is a cross-sectional view along the line 13-13 of FIG. 8.
Figure 14:
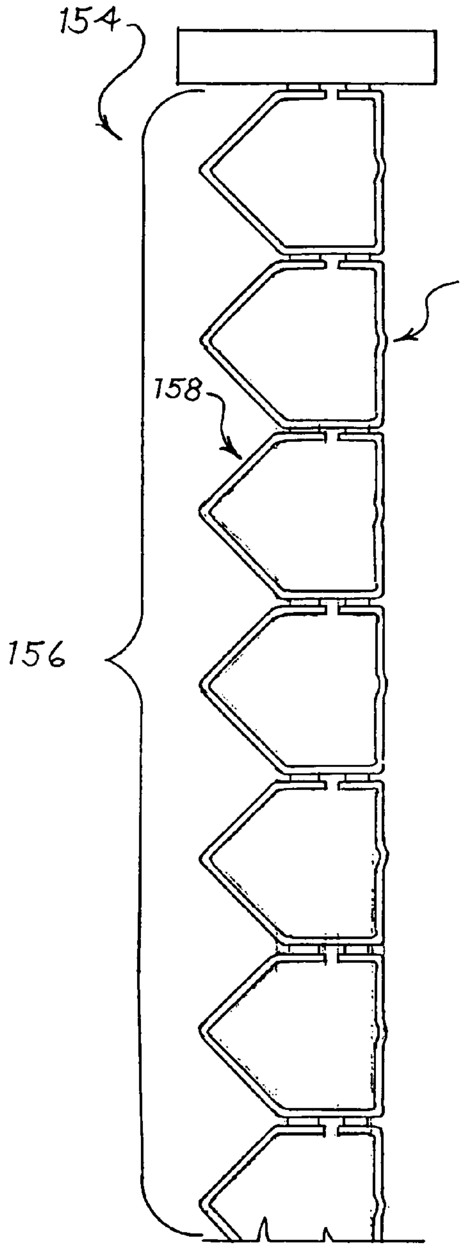
FIG. 14 is a perspective view of a window covering including the cellular structure formed according to the method of FIG. 8.

As with the previous embodiment, the row member 138 is transported downstream by conveyor belt 144 supporting the row member to stacker 146. As the row member 138 approaches stacker 146, an airflow device, such as blower 148 accelerates the downstream conveyance of the row member 138 into the stacker 146. Alternatively, although not shown, a set of rollers having a greater surface speed than the speed of the conveyor 144 can also be used to accelerate the row member 138. Preferably, such a set of rollers would be split rollers to avoid contact with the adhesive lines. Referring to FIG. 13, the row member 138 is supported within the stacker on lift member 150, which raises the row member 138 into contact with other row members 152 and bonds row member 138 thereto. A window covering 154 including the cellular structure 156 formed as described is shown in FIG. 14. As shown, when expanded, the cellular structure 156 forms a single column of cells, each cell having a pleated face 158 and a substantially flat rear 160. The rear 160 also acts as a limiting member which restricts the amount the cells and overall window covering may be expanded.

Figure 15:
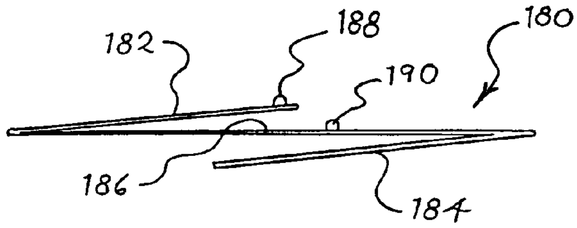
FIG. 15 is a schematic cross-sectional view of an alternative preform folding pattern for the material.
Figure 15A:
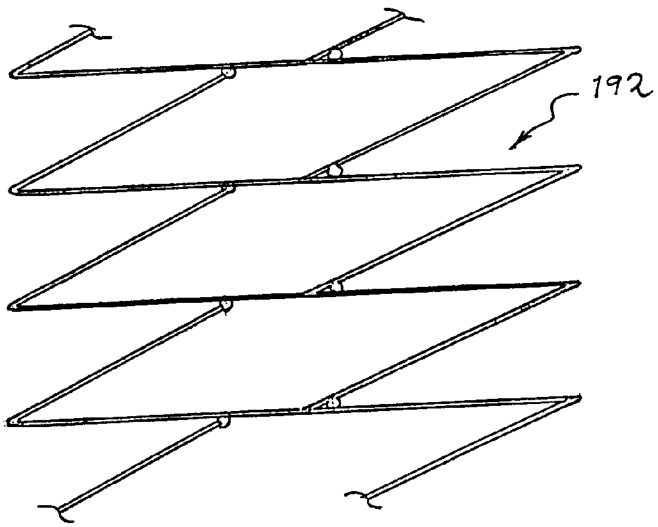
FIG. 15A is a foreshortened schematic cross-sectional view of the preform of FIG. 15 stacked with other similarly constructed preforms.

With each of the previous embodiments, a preform that forms a complete tube is described. Other folding patterns may also be utilized. For example, referring to FIG. 15, a non-tubular folding pattern is shown. Preform 180 is formed from marginal portions 182 and 184, which are overlapped with central portion 186. Adhesive lines 188 and 190 are placed by the adhesive applicator. When stacked, the preform 180 cooperates with similarly constructed preforms to form a cellular structure 192 such as shown in FIG. 15A.

Figure 16:
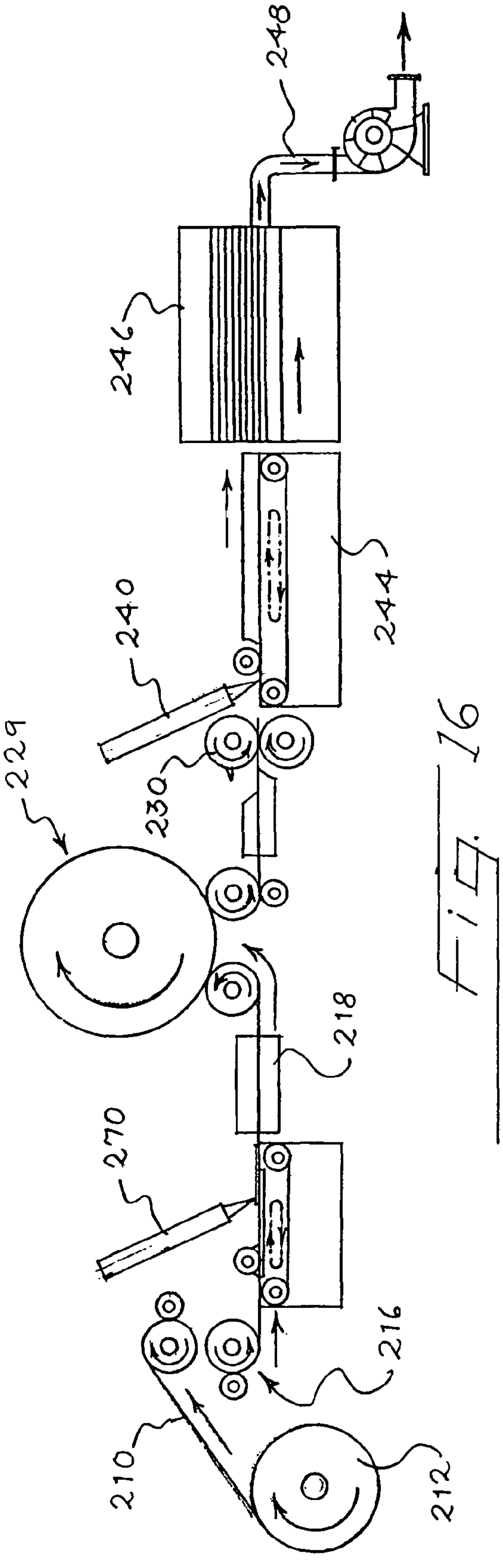
FIG. 16 is a schematic side view of another alternative embodiment of an apparatus for performing a method according to the present invention.
Figure 18:
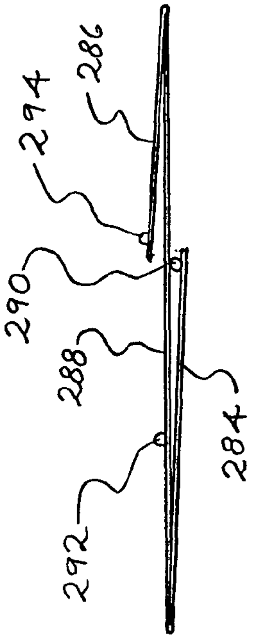
FIG. 18 is a schematic cross-sectional view of an alternative preform from FIG. 16.
Figure 17:
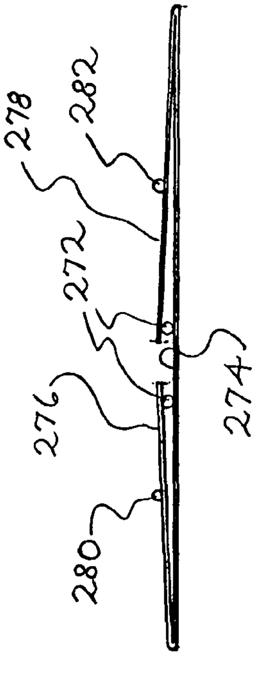
FIG. 17 is a schematic cross-sectional view of a preform from FIG. 16.

Another embodiment of a process and apparatus according to the present invention, is shown in FIGS. 16-18. In many respects, this embodiment is like that shown in FIGS. 1-6.

Referring to FIG. 16, as before, a continuous ribbon of material 210 is conveyed by a drive mechanism (not shown) from a roll 212 by way of a series of feed rollers 216 downstream to a folder 218. The material 210 is folded to form a preform, which is conveyed by another series of feed rollers 229 to a cutter 230. As in the previous embodiments, positioned downstream of the cutter 230 is an adhesive applicator 240 that applies at least one line of adhesive to the material that has passed downstream of the cutter 230. The row member is transported downstream to stacker 246 by conveyor belt 244, and as the row member approaches stacker 246, an airflow device, such as a vacuum 248, accelerates the downstream conveyance of the row member 238 into the stacker 246, which stacks the row member with similarly formed row members.

In this alternative embodiment, an additional adhesive applicator 270 is also provided. Adhesive applicator 270 places at least one line of adhesive on the material 210 before it enters the folder 218. For example, as shown in FIG. 17, adhesive lines 272 are placed on a central portion 274. Marginal portions 276 and 278 are folded over central portion 274 and adhered thereto by adhesive lines 272 to form this alternative preform. The preform then, as discussed above, is transported downstream to a cutter 230, and then adhesive applicator 240 places adhesive lines, such as lines 280 and 282. Because the adhesive lines 272 are used to adhere marginal portions 276 and 278 to central portion 274 before the material is cut, the cutter 230 and feed rollers 229 do not contact free adhesive. Another example of such a folding pattern is shown in FIG. 18. In this example marginal portion 284 and marginal portion 286 are folded over opposite surfaces of central portion 288. Only adhesive line 290 is applied by adhesive applicator 270. Adhesive lines 292 and 294 are applied by applicator 240. With each of these folding patterns, double cell rows are formed when stacked.

In the embodiments discussed, the conveyance of the material from the supply roll downstream to the cutter and to the stacker is a continuous process. One alternative is to convey material to the cutter in an intermittent or stop-and-go manner. For example, referring again to FIG. 1, the drive 14 may be operated such that after the cutter severs the material 10 to form a row member, the feeding of material to the cutter is halted. The row member continues to the stacker 46 for further processing as discussed. After the row member is stacked, the drive 14 resumes feeding material for processing. With such a configuration, it is preferred that the cutter, rather than being a rotating drum 32, is a guillotine-type cutter.

It is also contemplated that rather than supply a strip of material to a folder, a prefolded supply of material may be utilized. In other words, material can be formed into the preform in a separate procedure, or on a separate apparatus. This prefolded supply of preform material may then be processed through the cutting, application of adhesive, and stacking operations in any of the manners discussed above.

The foregoing descriptions are to be taken as illustrative, but not limiting. Still other variants within the spirit and scope of the present invention will readily present themselves to those skilled in the art.

What is claimed is:

1. A method for making an expandable honeycomb structure suitable for a window covering, the method comprising:
- providing a preform made by folding a ribbon of material to a cutter, wherein the cutter perforates the preform to define a row member;
- continuously applying at least one line of adhesive to the row member at a point downstream of the cutter;
- separating the row member from the preform after applying the adhesive to the row member;
- conveying the row member including the adhesive to a stacker; and
- stacking the row member with other row members before conveying a second row member to the stacker, and bonding the row member with the other row members as the row member is stacked.

2. The method of claim 1, wherein separating the row member from the preform comprises accelerating the row member relative to the preform.

3. The method of claim 1, further comprising increasing the downstream progress of the row member into the stacker with an airflow device.

4. The method of claim 1, further comprising providing a continuous ribbon of material to a folder, wherein the folder folds the continuous ribbon of material to form the preform.

5. The method of claim 4, wherein providing the continuous ribbon of material to the folder to form the preform immediately precedes and is continuous with providing the preform to a cutter.

6. The method of claim 4, wherein the preform is prefabricated.

7. The method of claim 4, further comprising:

applying an adhesive to the continuous ribbon of material;

folding the material to define at least one marginal portion and a main portion; and securing the marginal portion to the main portion prior to conveying the preform to the cutter.

8. An apparatus for making an expandable cellular structure suitable for use as a window covering, the apparatus comprising:

a drive for conveying a continuous ribbon of material to a folder, wherein the folder forms a preform from the continuous ribbon of material;

the drive further conveying the preform past a cutter positioned downstream of the folder, wherein the cutter perforates the preform to define a row member;

an adhesive applicator positioned downstream of the cutter for continuously applying at least one line of adhesive to the perforated ribbon of material;

an accelerator located downstream of the adhesive applicator, wherein the accelerator separates the row member by accelerating the row member; and a conveyor for transporting the row member having at least one line of adhesive to a stacker, wherein the stacker bonds the row member to other row members.

9. The apparatus of claim 8, wherein the accelerator includes an airflow device.

10. The apparatus of claim 8, further comprising a second adhesive applicator positioned upstream of the folder for applying at least one line of adhesive to the continuous ribbon of material prior to folding.

11. A method for making an expandable honeycomb structure suitable for a window covering, the method comprising:

providing a continuous preform by folding a continuous ribbon of material and conveying the preform a cutter, wherein the cutter perforates the preform to define a row member;

continuously applying at least one line of adhesive to the perforated preform at a point downstream of the cutter;

separating the row member from the preform after applying the adhesive to the row member by accelerating the row member relative to the preform conveying the row member including the adhesive to a stacker; and stacking the row member with other row members before conveying a second row member into the stacker, and bonding the row member with the other row members as the row member is stacked.

12. The method of claim 11, wherein providing the preform further comprises forming the preform immediately prior to conveying the preform to the cutter, and forming the preform includes conveying a continuous ribbon of material to a folder and folding the material.

13. The method of claim 11, wherein the preform is prefabricated.

14. The method of claim 11, wherein forming the preform comprises:

applying an adhesive to a continuous ribbon of material;

folding the material to define at least one marginal portion and a main portion; and securing the marginal portion to the main portion.

* * * * *

UNITED STATES PATENT AND TRADEMARK OFFICE

CERTIFICATE OF CORRECTION

PATENT NO. : 7,901,535 B2
APPLICATION NO. : 11/063764
DATED : March 8, 2011
INVENTOR(S) : Fu-Lai Yu It is certified that error appears in the above-identified patent and that said Letters Patent is hereby corrected as shown below:

CLAIMS:

Column 8, line 14, after “preform” add --;--

Signed and Sealed this
Fifth Day of July, 2011

David J. Kappos
*Director of the United States Patent and Trademark Office*